United States Patent
Gordon-Ingram et al.

(10) Patent No.: US 10,132,657 B2
(45) Date of Patent: Nov. 20, 2018

(54) POSITION ENCODER APPARATUS

(75) Inventors: Iain R. Gordon-Ingram, Marshfield (GB); Andrew P. Gribble, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 1768 days.

(21) Appl. No.: 13/257,622

(22) PCT Filed: Apr. 8, 2010

(86) PCT No.: PCT/GB2010/000714
§ 371 (c)(1),
(2), (4) Date: Sep. 20, 2011

(87) PCT Pub. No.: WO2010/116144
PCT Pub. Date: Oct. 14, 2010

(65) Prior Publication Data
US 2012/0007980 A1    Jan. 12, 2012

(30) Foreign Application Priority Data

Apr. 8, 2009   (GB) .................................. 0906257.1

(51) Int. Cl.
| | |
|---|---|
| *G01D 5/347* | (2006.01) |
| *G01B 11/02* | (2006.01) |
| *G01S 17/02* | (2006.01) |
| *G01C 11/04* | (2006.01) |
| *G01S 17/36* | (2006.01) |
| *H04N 7/18* | (2006.01) |

(52) U.S. Cl.
CPC ....... *G01D 5/34715* (2013.01); *G01B 11/022* (2013.01); *G01B 11/024* (2013.01); *G01C 11/04* (2013.01); *G01D 5/34792* (2013.01); *G01S 17/023* (2013.01); *G01S 17/36* (2013.01); *H04N 7/18* (2013.01); *H04N 7/181* (2013.01)

(58) Field of Classification Search
CPC ... G01B 11/022; G01B 11/024; G01S 17/023; G01S 17/36; H04N 7/18; H04N 7/181; G01C 11/04; G01D 5/34792; G01D 5/30; G01P 15/093
USPC ............ 348/135, 137, 136, 142; 250/231.18, 250/231.1, 231.11
See application file for complete search history.

(56) References Cited

U.S. PATENT DOCUMENTS

| | | | |
|---|---|---|---|
| 3,882,482 A | 5/1975 | Green et al. | |
| 3,916,186 A | 10/1975 | Raser | |

(Continued)

FOREIGN PATENT DOCUMENTS

| | | |
|---|---|---|
| CA | 2 247 353 | 9/1996 |
| CN | 1826509 A | 8/2006 |

(Continued)

OTHER PUBLICATIONS

International Search Report issued in International Application No. PCT/GB2010/000714 dated Oct. 5, 2010.

(Continued)

*Primary Examiner* — Shawn S An
(74) *Attorney, Agent, or Firm* — Oliff PLC (57) ABSTRACT

A position encoder apparatus, including a scale having a series of position features; and a readhead configured to read the series of position features via a snapshot capture process. The snapshot capture process is adaptable so as to compensate for the relative speed between the scale and readhead.

23 Claims, 4 Drawing Sheets

(56) References Cited

U.S. PATENT DOCUMENTS

| | | | |
|---|---|---|---|
| 4,469,940 | A | 9/1984 | Schmitt |
| 4,469,958 | A | 9/1984 | Schmitt |
| 4,631,519 | A | 12/1986 | Johnston |
| 4,764,879 | A | 8/1988 | Campbell |
| 5,210,409 | A * | 5/1993 | Rowe ................. 250/227.18 |
| 5,279,044 | A | 1/1994 | Bremer |
| 5,294,793 | A | 3/1994 | Schwaiger et al. |
| 5,332,895 | A | 7/1994 | Rieder et al. |
| 5,539,993 | A | 7/1996 | Kilpinen et al. |
| 5,965,879 | A | 10/1999 | Leviton |
| 6,043,768 | A | 3/2000 | Strasser et al. |
| 6,438,860 | B1 | 8/2002 | Glimm |
| 6,483,104 | B1 | 11/2002 | Benz et al. |
| 6,636,354 | B1 * | 10/2003 | D'Hooge ............. G02B 21/06 359/368 |
| 6,867,412 | B2 | 3/2005 | Patzwald et al. |
| 6,927,704 | B1 | 8/2005 | Rouleau |
| 7,180,430 | B2 | 2/2007 | Ng et al. |
| 7,227,124 | B2 | 6/2007 | Altendorf |
| 7,289,042 | B2 | 10/2007 | Gordon-Ingram |
| 7,432,496 | B1 * | 10/2008 | Nahum ............. G01D 5/34707 250/208.1 |
| 7,550,710 | B2 | 6/2009 | McAdam |
| 7,763,875 | B2 * | 7/2010 | Romanov ............ G01D 5/2495 250/208.1 |
| 2003/0145479 | A1 | 8/2003 | Mayer et al. |
| 2005/0133705 | A1 | 6/2005 | Hare et al. |
| 2006/0284062 | A1 | 12/2006 | Altendorf |
| 2007/0051884 | A1 | 3/2007 | Romanov et al. |
| 2008/0013105 | A1 * | 1/2008 | McMurtry et al. ........... 356/618 |
| 2008/0040942 | A1 * | 2/2008 | Eales ................. G01D 5/34 33/707 |
| 2008/0099662 | A1 * | 5/2008 | Musiel ................. G01J 1/08 250/205 |
| 2010/0134790 | A1 | 6/2010 | Vokinger et al. |
| 2011/0139873 | A1 | 6/2011 | Sprenger |

FOREIGN PATENT DOCUMENTS

| | | |
|---|---|---|
| CN | 1896695 A | 1/2007 |
| CN | 1973184 A | 5/2007 |
| DE | 34 27 067 A1 | 2/1985 |
| DE | 39 36 452 A1 | 5/1991 |
| DE | 44 36 784 A1 | 4/1995 |
| DE | 44 03 218 A1 | 5/1995 |
| DE | 43 41 767 C1 | 6/1995 |
| DE | 196 38 912 A1 | 3/1998 |
| DE | 100 25 760 A1 | 12/2001 |
| EP | 0 207 121 B1 | 1/1990 |
| EP | 1 420 229 A1 | 5/2004 |
| EP | 1 775 559 A1 | 4/2007 |
| EP | 1 995 567 A1 | 11/2008 |
| GB | 2 353 421 A | 2/2001 |
| JP | A-60-231111 | 11/1985 |
| JP | A-01-250820 | 10/1989 |
| JP | A-06-148098 | 5/1994 |
| JP | A-09-113313 | 5/1997 |
| JP | A-09-311052 | 12/1997 |
| JP | A-2001-074507 | 3/2001 |
| JP | A-2002-354835 | 12/2002 |
| JP | A-2003-141673 | 5/2003 |
| JP | A-2005-337757 | 12/2005 |
| JP | A-2006-038569 | 2/2006 |
| JP | A-2006-170790 | 6/2006 |
| WO | WO 01/89966 A1 | 11/2001 |
| WO | WO 02/084223 A1 | 10/2002 |
| WO | WO 03/061891 A2 | 7/2003 |
| WO | WO 2004/094957 A1 | 11/2004 |
| WO | WO 2005/124282 A2 | 12/2005 |
| WO | WO 2006/003452 A2 | 1/2006 |
| WO | WO 2006/010954 A1 | 2/2006 |
| WO | WO 2006/120440 A1 | 11/2006 |
| WO | WO 2007/030731 A2 | 3/2007 |
| WO | WO 2009/053719 A2 | 4/2009 |

OTHER PUBLICATIONS

Written Opinion issued in International Application No. PCT/GB2010/000714 dated Oct. 5, 2010.
Search Report issued in British Patent Application No. GB0906257.1 dated Sep. 1, 2009.
Oct. 15, 2013 Official Notice of Rejection issued in Japanese Patent Application No. 2012-504071 (with translation).
Oct. 30, 2013 Office Action issued in Chinese Patent Application No. 201080015768.6 (with translation).
Dec. 17, 2013 Notice of Final Decision of Rejection issued in Japanese Patent Application No. 2012-504072 (with translation).
Jan. 17, 2014 Notice of Allowance issued in U.S. Appl. No. 13/259,683.
Jan. 20, 2014 Office Action issued in Chinese Patent Application No. 201080015769.0 (with translation).
"Technical Support Package—Absolute Position Encoders With Vertical Image Binning," NASA Tech Briefs GSC-14633-1, pp. 1-5, National Aeronautics and Space Administration, Greenbelt, Maryland.
Denic et al., "High-Resolution Pseudorandom Encoder with Parallel Code Reading," Elektronika Ir Elektrotechnika, 2004, pp. 14-18, vol. 7, No. 56, Aukstuju Dazniu Technologija, Mikrobangos.
U.S. Appl. No. 13/259,683, filed Sep. 23, 2011 in the name of Gordan-Ingram et al.
Nov. 3, 2010 International Search Report issued in Application No. PCT/GB2010/000716.
Nov. 3, 2010 Written Opinion of the International Searching Authority issued in Application No. PCT/GB2010/000716.
Aug. 14, 2009 British Search Report issued in British Application No. GB 0906258.9.
Jun. 27, 2013 Office Action issued in Chinese Patent Application No. 201080015769.0 (with translation).
May 14, 2013 Office Action issued in U.S. Appl. No. 13/259,683.
Aug. 20, 2013 Office Action issued in Japanese Patent Application No. 2012-504072 (with translation).
Mar. 10, 2017 Office Action issued in European Patent Application No. 10718251.1.
Jul. 30, 2016 Office Action issued in Korean Application No. 10-2011-7026648.
Sep. 3, 2014 Office Action issued in Chinese Patent Application No. 201080015768.6 (with English translation).
Oct. 25, 2017 Office Action issued in Indian Application No. 7389/DELNP/2011.
Feb. 19, 2018 Office Action issued in Indian Application No. 7577/DELNP/2011.
Mar. 8, 2018 Office Action issued in European Application No. 10 718 251.1.

* cited by examiner

POSITION ENCODER APPARATUS

This invention relates to a position encoder apparatus and a method of operating a position encoder.

Position encoders for measuring the relative position between two moveable objects are well known. Typically, a series of scale markings are provided on one object and a readhead for reading the scale markings on another. The scale markings can be formed integrally with the object or can be provided on a scale which can be secured to the object.

A position encoder is commonly categorised as being either an incremental position encoder or an absolute position encoder. In an incremental position encoder the scale has a plurality of periodic markings which can be detected by the readhead so as to provide an incremental up/down count. For instance, such a scale is described in European Patent Application no. 0207121. Reference marks can be provided, either next to or embedded in the periodic markings so as to define reference points. For example, such a scale is disclosed in Published International Patent Application WO 2005/124282. An absolute position encoder typically measures relative displacement by a readhead detecting unique series of marks, e.g. codes, and translating those codes into an absolute position. Such a scale is disclosed in International Patent Application no. PCT/GB2002/001629.

For certain types of encoder apparatus it is known to operate the readhead so that it obtains snapshot images of the scale in order to read the markings on the scale.

This invention provides improvements to the types of position encoder apparatus in which the readhead obtains snapshot images of the scale in order to read the markings on the scale.

In accordance with a first aspect of the invention there is provided a position encoder apparatus, comprising: a scale comprising a series of position features; and a readhead configured to read the series of position features via a snapshot capture process that is adjustable so as to compensate for the relative speed between the scale and readhead.

A position encoder apparatus according to the invention can therefore adapt the process via which it captures a snapshot of the scale's position features depending on the relative speed of the scale and readhead. One particular advantage of the invention is that the snapshot capture process can be adapted so as maximise the quality of the snapshot obtained. For instance, at low speeds the snapshot capture process can be adapted so as to capture a strong signal without risk of the snapshot being blurred or distorted, whereas at high-relative speeds the snapshot capture process can be adapted to avoid blurring or distortion of the snapshot but in the process reduces the strength of the signal. The reduction in signal strength can mean that there is a less favourable signal-to-noise ratio meaning that position extraction could be less reliable and/or less accurate. At high speed, accuracy is often less critical and so a reduction in signal strength can be acceptable.

Accordingly, the snapshot capture process can be adapted to obtain the best quality snapshot for the given relative speed. Not only can this increase the efficiency by which position information can be obtained from the snapshot, but it can also enable the accuracy of position information obtained to be maximised.

The snapshot capture process could be adaptable manually. For instance, the user could configure the snapshot capture process prior to, or during, use depending on the expected or known relative speed. For instance, the readhead could have a hardware or software selector which could be used by the user to configure the process. Preferably, the snapshot capture process is automatically adaptable dependent on the relative speed between the scale and readhead. Accordingly, preferably the snapshot capture process can be adapted without user intervention.

The snapshot capture process could be adjusted automatically based on an estimated relative speed. For instance, the snapshot capture process could be adjusted automatically based on an estimated relative speed provided by a machine controller which is controlling the relative movement between the bodies to which the readhead and scale are attached. This could for instance be based on the demanded speed by the machine controller.

Any adjustment to the snapshot capture process could be determined automatically based on an actual measured relative speed. For instance, a speedometer or the like could be used to measure the relative speed. Optionally, the actual measured relative speed can be based on readings obtained by the readhead.

Any adjustment to the snapshot capture process could be determined by a unit external to the readhead. For instance, the position encoder apparatus could further comprise a processor device in communication with the readhead. The processor device could determine the snapshot capture process and instruct the readhead to operate accordingly.

Preferably any adjustment to the snapshot capture process is determined by the readhead. In particular, preferably, the readhead is configured to determine the relative speed between the scale and readhead. More preferably the readhead is configured to determine the relative speed between the scale and readhead based on at least one snapshot obtained by the readhead.

As will be understood, the readhead will comprise at least one detector for sensing the series of position features. The readhead can comprise at least one electromagnetic radiation ("EMR") sensitive detector. The at least one EMR sensitive detector can be an optical EMR sensitive detector. As will be understood, this can include detectors suitable for sensing electromagnetic radiation (EMR) in the infrared to ultraviolet range. For instance, the detector could be a visible EMR sensitive detector. The readhead could comprise a plurality of detector elements. For instance the readhead could comprise an array of detector elements. The array could be 1-dimensional or 2-dimensional.

The readhead can comprise at least one EMR source for illuminating the scale. The at least one EMR source can be an optical source. As will be understood, this can include sources suitable for emitting electromagnetic radiation (EMR) in the infrared to ultraviolet range. For instance, the source could be a visible EMR source. For example, the source could be a light emitting diode (LED).

The shapshot capture process can be adaptable so as to change the intensity of EMR emitted by at least one of the at least one EMR sources. For example, the shapshot capture process can be adaptable so as to change the intensity of optical EMR emitted by at least one of the at least one EMR sources.

Preferably, the snapshot capture process is adaptable so as to change the duration that EMR is emitted by at least one of the at least one EMR sources during the snapshot capture process. Preferably, the readhead is configured to limit the maximum duration that EMR is emitted for based on the relative speed.

Any adjustment to the snapshot capture process can take into consideration factors other the magnitude of the relative speed. For instance, the snapshot capture process could also be adaptable based on the quality of previous snapshots, and/or the temperature of the readhead. For instance, if the readhead is quite hot then the snapshot capture process could be adapted so as to minimise heat generation. For example, in the case in which a light source is flashed, the length of the flash can be restricted to minimise heat generation.

The snapshot capture process can be adaptable so as to change the readhead's feature detection sensitivity dependent on the relative speed between the scale and readhead. For instance, if the readhead comprises at least one optical EMR sensitive detector, then the snapshot capture process could be adaptable so as to change the gain of the image sensor. The snapshot capture process can be adaptable so as to change the readhead's feature capture duration dependent on the relative speed between the scale and readhead. Optionally, the readhead's feature capture duration could be constant irrespective of the relative speed.

The series of position features could define incremental information. The series of position features can define absolute position information. The series of position features could be contained in a single track. Optionally, the series of position features could be spread across multiple tracks. The scale could comprise a first series of position features defining incremental information and a second series of position features defining absolute position information.

The position encoder apparatus can be a magnetic or inductive position encoder apparatus. The position encoder apparatus can be a capacitive position encoder apparatus. In these instances, the snapshot capture process could be adjusted by changing the length of time for which the scale features are sampled, for instance.

Optionally, the position encoder apparatus is an optical position encoder apparatus. In this case, the position encoder apparatus could be transmissive in which the readhead detects light transmitted through the scale. Optionally, the position encoder apparatus could be reflective in which the readhead detects light reflected off the scale. The readhead could comprise an optical source for illuminating the scale.

As will be understood, there are many suitable ways in which the features can be defined on a scale. For instance, features can be defined by markings having particular electromagnetic radiation (EMR) properties, for example particular optical properties, for instance by the particular optical transmissivity or reflectivity of parts of the scale. Accordingly, a feature could for example be defined by parts of the scale having a minimum reflectivity or transmissivity value. Optionally, a feature could for example be defined by parts of the scale having a maximum reflectivity or transmissivity value. In the case of a magnetic encoder, features can be defined by markings having particular magnetic properties or for instance by the presence or absence of ferromagnetic material. In the case of capacitive scale features can be defined by markings having particular capacitive properties.

The features can take the form of lines, dots or other configurations which can be read by a readhead. Preferred configurations for one-dimensional scales can comprise lines extending across the entire width of a track in a dimension perpendicular to the measuring dimension.

According to a second aspect of the invention there is provided a position encoder readhead for reading a series of position features on a scale to determine the relative position between itself and the scale, in which the readhead is configured to read position features on a scale via a snapshot capture process that is adaptable so as to compensate for the relative speed between the scale and readhead.

According to a third aspect of the invention, there is provided a method of operating a position encoder readhead comprising: the readhead reading a series of position features on a scale via a snapshot capture process; and adapting the snapshot capture process so as to compensate for the relative speed between the scale and readhead.

The method can further comprise determining the relative speed between the scale and readhead based on readings taken by the readhead, and adapting the snapshot capture process based on the determined relative speed. Adapting the snapshot capture process can comprise changing the readhead's feature capture duration dependent on the relative speed between the scale and readhead.

The readhead can comprise at least one EMR source and adapting the snapshot capture process comprising changing the duration that EMR is emitted by at least one of the at least one EMR sources during the snapshot capture process.

An embodiment of the invention will now be described, by way of example only, with reference to the following drawings in which.

Figure 1:
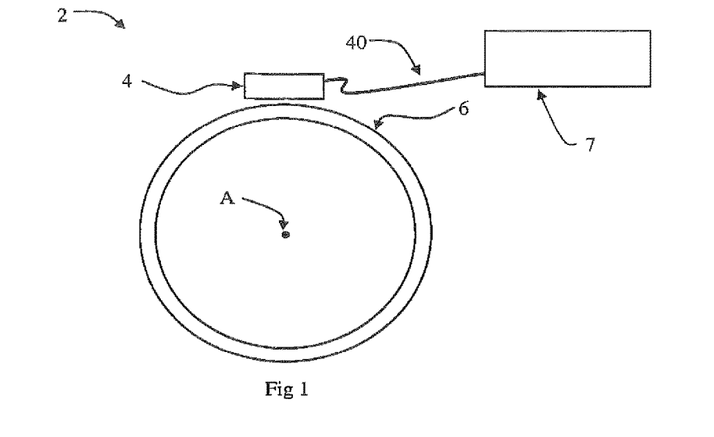
FIG. 1 is a schematic side view an encoder apparatus according to the invention comprising a ring scale and a readhead.
Figure 2:
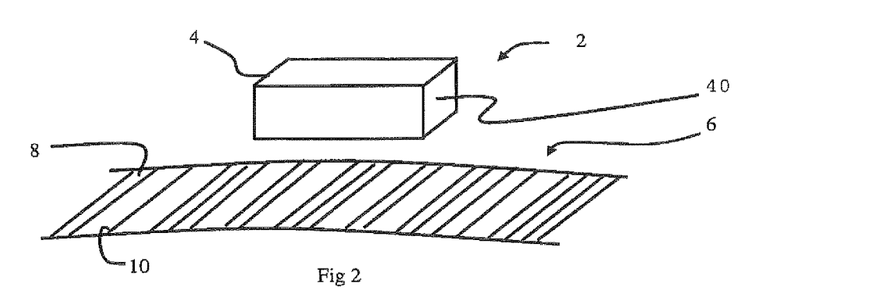
FIG. 2 is a schematic isometric view of the encoder apparatus of FIG. 1.

Referring to FIGS. 1, 2, 3a and 3b there is shown an encoder apparatus 2 comprising a readhead 4, scale 6 and controller 7. The readhead 4 and scale 6 are mounted to first and second objects respectively (not shown). The scale 6 is rotatable about axis A (which extends perpendicular to the page as shown in FIG. 1) relative to the readhead. In the embodiment described, the scale 6 is a rotary scale. However, it will be understood that the scale 6 could be a non-rotary scale, such as a linear scale. Furthermore, the scale 6 enables measurement in a single dimension only. However, it will be understood that this need not be the case, and for example the scale could enable measurement in two dimensions.

In the described embodiment, the scale 6 is an absolute scale and comprises a series of reflective 8 and non-reflective 10 lines arranged to encode unique position data along its length. As will be understood, the data can be in the form of, for instance, a pseudorandom sequence or discrete codewords.

The width of the lines depends on the required positional resolution and is typically in the range of 1 μm to 100 μm, and more typically in the range of 5 μm to 50 μm. In the described embodiment, the width of the lines is in the order of 15 μm. The reflective 8 and non-reflective 10 lines are generally arranged in an alternate manner at a predetermined period. However, select non-reflective lines 10 are missing from the scale 6 so as to encode absolute position data in the scale 6. For instance, the presence of a non-reflective line can be used to represent a "1" bit and the absence of a non-reflective line can represent a "0" bit.

Referring to FIGS. 6a, 6b and 6c there is shown respectively a schematic illustration of a plan view of a section of the scale 6 showing the reflective 8 and non-reflective 10 lines, the output 50 of the sensor imaging that section, and the binary value of a whole codeword contained within the imaged section. As shown in FIG. 6a, some of the non-reflective 10 lines have been removed to define discrete codewords encoding absolute position data. For instance, the lines contained within dashed box 11 define one unique 16-bit codeword. "1" bits are defined by the presence of a non-reflective line 10 and "0" bits are defined by the absence of a non-reflective line 8. FIG. 6b is an illustration of the intensity variation across an image obtained by the CMOS sensor 20. The CPU 24 can analyse the output and apply an intensity threshold $A_b$ at the points where it expects to see a reflective line. The CPU 24 interprets those points where the intensity is less than the threshold $A_b$ as a "1" and those points where the intensity is greater than the threshold $A_b$ as a "0". FIG. 6c illustrates the codeword extracted by the CPU 24 applying this algorithm to the output shown in FIG. 6b.

A series of groups of markings can be used to encode a series of unique binary codewords along the scale length defining unique, i.e. absolute, position information. Further details of such a so-called hybrid incremental and absolute scale is described in International Patent Application no. PCT/GB2002/001629 (publication no. WO 2002/084223), the content of which is incorporated in this specification by this reference.

As will be understood, absolute position data could be encoded in the scale 6 by missing reflective lines 8, as well as, or instead of, missing non-reflective lines 10. Furthermore, absolute position data could be embedded in the scale 6 without the addition or removal of reflective 8 or non-reflective lines 10. For instance, the width of lines, the distance between them or their colour could be varied in order to embed the absolute position data in the scale 6. As will also be understood, the invention could also be used with incremental scales. In this case, if desired, reference marks could be provided either adjacent, or embedded within, the incremental scale track.

Figure 3A:
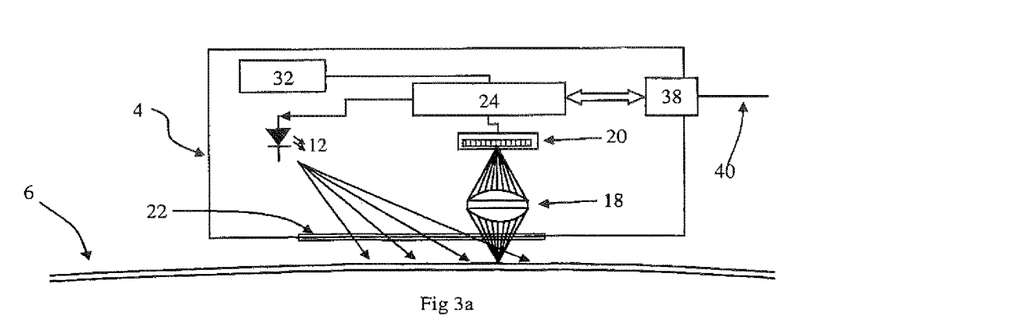
FIG. 3a is a schematic block diagram of the various optical and electronic components of the readhead according to a first embodiment.

As illustrated in FIG. 3a the readhead 4 comprises a Light Emitting Diode ("LED") 12, an optical element 18, a Complemenary Metal-Oxide-Semiconductor ("CMOS") image sensor 20 and a window 22. Light emitted from the LED 12 passes through the window 22 and falls on the scale 6. The scale 6 reflects the light back through the window 22 which passes through the lens 18 which in turn images the scale onto the CMOS image sensor 20 using the reflected light.

Accordingly, the CMOS image sensor 20 detects an image of a part of the scale 6. The CMOS image sensor 20 comprises a single row of 256 elongate pixels whose length extend parallel to the length of the reflective 8 and non-reflective lines 10 on the scale. The embodiment shown is of the reflective type, but as will be understood, the invention can be used with transmissive type encoder apparatus (in which the light is transmitted through the scale rather than being reflected from it).

The readhead 4 also comprises a CPU 24, a memory device 32 in the form of Electrically Erasable Programmable Read-Only Memory (EEPROM) and an interface 38.

The LED 12 is connected to the CPU 24 so that the LED 12 can be operated on demand by the CPU 24. The CMOS image sensor 20 is connected to the CPU 24 such that the CPU 24 can receive an image of the intensity of light falling across the CMOS image sensor 20. The CMOS image sensor 20 is also directly connected to the CPU 24 so that the CMOS image sensor 20 can be operated to take a snapshot of intensity falling across it on demand by the CPU 24. The CPU 24 is connected to the memory 32 so that it can store and retrieve data for use in its processing. For instance, in this embodiment the memory 32 contains a plurality of lookup tables. One of the lookup tables will be used in the determination of the relative position of the readhead 4 and scale 6 as explained in more detail below. The interface 38 is connected to the CPU 24 so that the CPU 24 can receive demands from and output results to an external device such as a controller 7 (shown in FIG. 1) via line 40. The line 40 also comprises power lines via which the readhead 4 is powered.

Figure 3B:
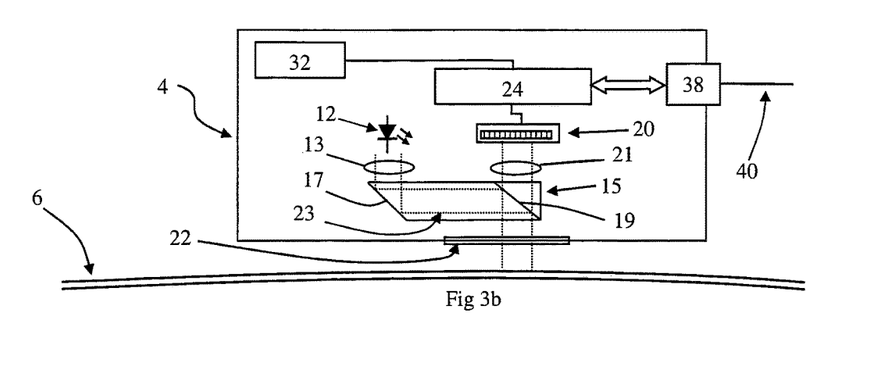
FIG. 3b is a schematic block diagram of the various optical and electronic components of the readhead according to a second embodiment.

The readhead illustrated in 3b is substantially the same as that illustrated in 3a and like parts share like reference numerals. However, the optical arrangement of the embodiment shown in FIG. 3b is slightly different. In this embodiment, the readhead 4 comprises a collimating lens 13, a beam splitter assembly 15 having a reflecting face 17 and a beam splitting face 19, and an imaging lens 21. The collimating lens 13 collimates light emitted from the LED 12 into a beam 23 which is then reflected by the splitter assembly's reflecting face 17 toward the beam splitting face 19. The beam splitting face 19 reflects the beam 23 toward the scale 6 via window 22, which then reflects the light back through the window 22 toward beam splitting face 19 which allows the reflected light to pass straight through it. The reflected light then passes through the imaging lens 21 which forms an image of the scale 6 onto the CMOS image sensor 20.

Figure 4:
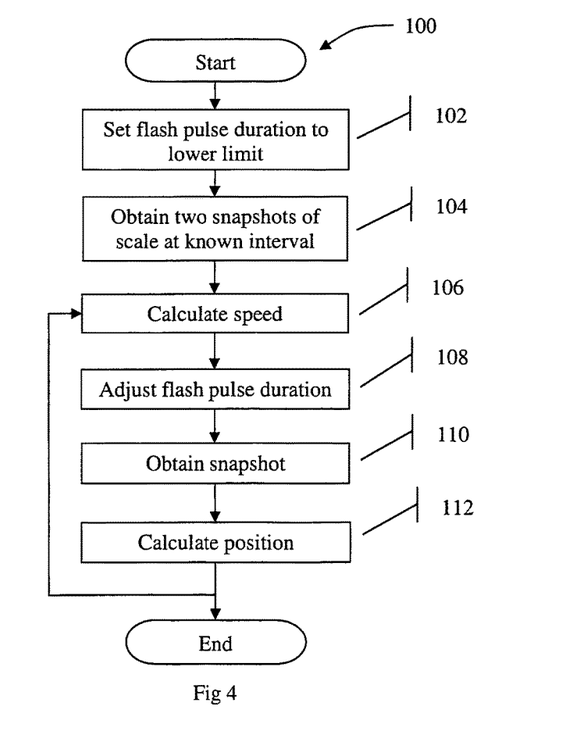
FIG. 4 is a flow chart illustrating an overview of the operation of the readhead shown in FIGS. 1 to 3.
Figure 5:
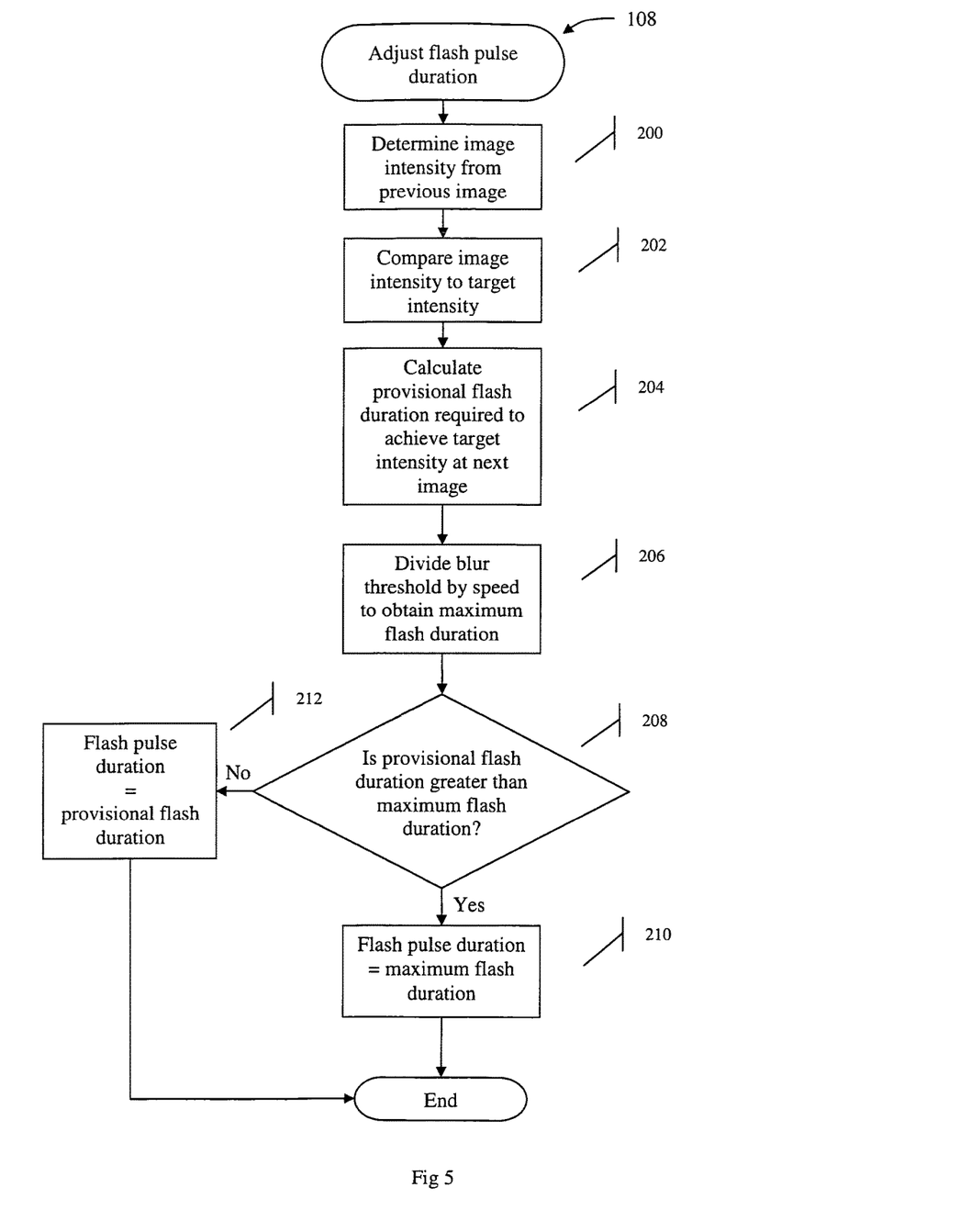
FIG. 5 is a flow chart illustrating the process of adjusting the flash pulse duration.

The method of operation 100 of the apparatus 2 will now be described with reference to FIGS. 4 and 5. The method begins when the readhead 4 is powered up. As explained in more detail below, in order to select an appropriate flash pulse duration, at least the approximate magnitude of the relative speed (i.e. the speed) between the readhead and scale needs to be known. The speed could be received externally from the readhead, for instance from a second readhead (not shown) or from a different instrument (not shown), for instance from a speedometer measuring the speed of the moving part(s) and/or from a machine controller which is powering the relative movement between the scale and readhead.

In the described embodiment the readhead 4 itself calculates the relative speed and it does this by obtaining and processing at least two snapshots of the scale in order to work out the relative distance the scale and readhead have moved within a certain time interval. Accordingly, the readhead 4 first of all needs to set the flash pulse duration so that it can obtain snapshots of the scale 6 which it can use to determine the relative position. As the relative speed is initially not known, the readhead 4 sets the flash pulse duration to a predetermined minimum time. This predetermined minimum time can be the shortest flash pulse duration that is considered will provide the minimum information needed to image the scale 6 and obtain position information. As will be understood, the predetermined minimum time can be different for each given scale and readhead combination. The predetermined lower time limit can be set in the readhead's 4 memory 32 or could be received from the controller 7 via the line 40. In this embodiment, this duration is 50 nano seconds. As will be understood, in other embodiments, the flash pulse duration could be set initially to a value substantially greater than the predetermined minimum time, and reduced accordingly if the images obtained are unreadable.

At step 104, the readhead then captures two snapshots of the scale 6 at a known time interval (i.e. the snapshots are taken at two different times). The capturing of each snapshot involves the CPU 24 controlling the LED 12 to emit light for the flash pulse duration, and also controlling the CMOS image sensor 20 to simultaneously sense and register the intensity of the pattern of light falling across it.

At step 106, the relative speed of the readhead 4 and scale 6 is calculated. This can be done by calculating the relative position of the readhead 4 and scale 6 at each snapshot (by extracting the codeword from each image, and looking up the position corresponding to that codeword in a lookup table stored in memory 32), determining the change in position between each snapshot and dividing this change in position by the time between the snapshots. As will be understood, in the described embodiment the calculated relative speed will be a relative angular speed, but in the case of a linear scale the calculated relative speed will be a relative linear speed.

At step 108, the flash pulse duration is adjusted depending on the calculated relative speed, and this process is described in more detail below with reference to FIG. 5. In general, the greater the relative speed the shorter the flash pulse duration and vice versa.

At step 110, the readhead 4 obtains another snapshot of the scale 6. As before, this involves the CPU 24 controlling the LED 12 to emit light for the flash pulse duration calculated in the previous step 108, and also controlling the CMOS image sensor 20 to simultaneously sense and register the intensity of the pattern of light falling across it. Step 110 is performed on receipt of a position request from the controller 7. However, if a position request has not been received from the controller 7 within a predetermined maximum time limit then the readhead 4 initiates step 110. This ensures that the relative speed is continuously updated and therefore a good image of the scale can be obtained when the controller does eventually request position information.

At step 112, the CPU 24 then uses the image of the scale 6 in order to calculate the absolute relative position between the readhead 4 and the scale 6. This involves the CPU 24 analysing the image received from the CMOS image sensor in order to extract a codeword from the image. The absolute relative position corresponding to this codeword is then determined by the CPU 24 using a look-up table stored in the memory 32. If step 110 was initiated in response to a position request from the controller 7, then the absolute relative position is sent to the controller 7.

The relative position between the scale and the readhead can be fine tuned by determining the relative phase offset between the scale markings and the CMOS image sensor 20. As illustrated in FIG. 6(b), the relative phase offset can be determined by calculating the phase between the signal 50 output by the CMOS image sensor 20, and reference SINE and COSINE waves having the same fundamental period as the signal 50 output by the CMOS image sensor 20. Only the reference SINE wave 52 is shown in FIG. 6(b) for the sake of clarity. The reference waves have a predetermined position relative to the CMOS image sensor. For instance, with regard to the reference SINE wave 52, the point 54 at which the SINE wave crosses the zero point from positive to negative is at the centre of the CMOS image sensor 20. As can be seen in the illustrated example, the SINE wave 52 signal 50 output by the CMOS image sensor are approximately 90° out of phase. Methods for extracting phase are known and for instance, are described in WO2004094957.

As will be understood, the accuracy of phase extraction, and hence the accuracy to which the absolute relative position can be determined is affected by the signal-to-noise ratio of the signal 50 obtained by the CMOS image sensor. Accordingly, at lower speeds in which more scale signal is obtained, the signal-to-noise ratio is more favourable than that at higher speeds, and hence more accurate position information can be obtained at lower speeds.

Control of flow then returns back to step 106 at which point the relative speed is updated based on the two latest position readings. This loop continues until the readhead 4 is powered down.

Figure 6:
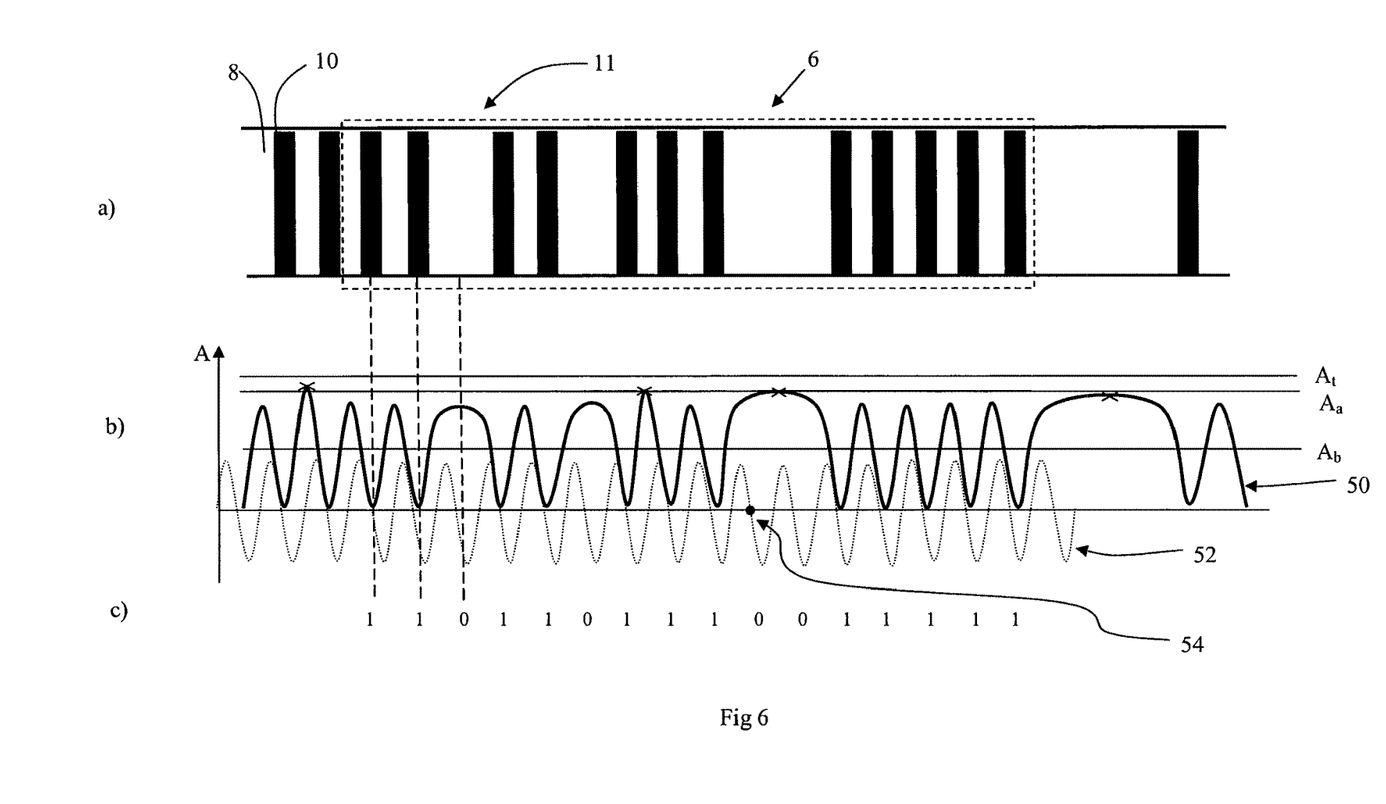
FIG. 6a is a schematic plan view of the scale shown in FIGS. 1 and 2.
FIG. 6b is a schematic illustration of the output from the sensor of the readhead shown in FIGS. 1, 2 and 3.
FIG. 6c is a schematic illustration of a codeword extracted from the image of the scale.

The process of adjusting the flash pulse duration will now be described in more detail with reference to FIGS. 5 and 6. The process begins at step 200 which comprises determining the image intensity from the immediately preceding image of the scale 6. Referring back to FIG. 6b, step 200 can be done by identifying, and taking an average of, the four highest intensity values output by the CMOS sensor 20. The four highest intensity values are identified in FIG. 6b by an "x" and their average is illustrated by the line $A_a$.

At step 202 the average intensity $A_a$ is then compared to a target intensity value (illustrated by the line $A_t$) to determine the difference between them. The target intensity value is the optimum average intensity for the given scale and readhead combination. The intensity doesn't want to be too low or too high as this can make it difficult to identify the features and therefore difficult to extract the codeword from the image. The average intensity can be affected by a number of factors including the reflectivity of the scale (which can be affected by how dirty the scale is), the brightness of the LED 12, the duration for which the LED 12 is turned on and the sensitivity/gain of the CMOS image sensor.

At step 204, the CPU 24 calculates a provisional flash pulse duration, which is the estimated flash length in order to achieve the target intensity at the next image. This value is only provisional as it is also necessary to take into consideration the relative speed of the readhead 4 and scale 6. For instance, it may be determined at step 204 that the LED 12 needs to be turned on for 500 nano seconds in order to achieve the target intensity, but the relative speed of the readhead 4 and scale 6 may be 50 m/s. If the LED 12 was turned on for this length of the time then due to the high speed the image would be too blurred and it wouldn't be possible to extract the codeword. The flash pulse duration therefore needs to be reduced accordingly, for instance to 100 nano seconds.

The CPU 24 can cope with a certain amount of movement between the readhead 4 and scale 6 during a snapshot capture, i.e. it can cope with a certain amount of blur. Accordingly, each readhead has a "blur threshold" which can be stored in the readhead's memory 32 or provided by the controller 7. The blur threshold is the maximum distance moved between the readhead 4 and scale 6 during a snapshot that the readhead can cope with. The extent of the blur that it can cope with, and hence the blur threshold value, depends on a number of factors including the scale period and feature size. For the embodiment described, the blur threshold will typically be in the region of 5 µm to 10 µm.

At step 206, the blur threshold value is divided by the most recent calculation of the relative speed of the readhead 4 and scale 6 in order to obtain the maximum flash duration allowable without risking obtaining a blurred image. At step 208 the provisional flash duration is compared with the maximum flash duration. If the provisional flash duration is greater than the maximum flash duration then the actual flash pulse duration is set at step 210 to be the maximum flash duration (in order to prevent blur). Otherwise, the actual flash pulse duration is set at step 212 to be equal to the calculated provisional flash duration.

In the described embodiment the flash pulse duration is adjusted to compensate for the relative speed of the readhead 4 and scale 6. The exposure time of the sensor can also be adjusted accordingly if desired. Otherwise, the exposure time of the sensor could be fixed at a duration equal to or greater than the maximum flash pulse duration. Instead of, or as well as adjusting the flash pulse duration, it would also be possible to change other parameters of the snapshot capture process. For instance, if the CMOS sensor 20 has a variety of sensitivity settings, then the sensitivity of the CMOS sensor 20 could be adjusted accordingly. For instance, the sensitivity could be increased as the relative speed increases. Also, the length of time that the CMOS sensor 20 records the intensity of light falling on it could be reduced as the speed increases.

As will be understood, the scale's pattern can be formed via mechanisms other than features having different optical properties. For instance, as is well known, features having different magnetic, capacitive or inductive properties can be used to encode position information onto a scale. In these cases an appropriate magnetic, capacitive or inductive sensor arrangement will be provided in place of the lens 18 and CMOS image sensor 20 in the readhead 4. Furthermore, in these cases rather than adjusting the flash pulse duration, other factors can be adjusted to compensate for the relative speed. For instance, the sensing duration and/or sensitivity of the magnetic, capacitive or inductive sensor arrangement can be adjusted.

The invention claimed is:

1. An absolute position encoder apparatus, comprising:
a scale comprising features that encode along the length of the scale a series of unique position data pieces defining absolute position information; and
a readhead comprising a sensor configured to read the features via a process for capturing a single snapshot, the process being automatically adaptable so as to change, dependent on the relative speed between the scale and the readhead, at least one of:
(i) the feature capture duration of the readhead during the process, and
(ii) the duration that electromagnetic radiation ("EMR") is emitted by at least one electromagnetic radiation ("EMR") source during the process,
wherein the absolute position encoder apparatus is further configured to use the captured snapshot to fine-tune a determined absolute position between the readhead and the scale by determining a relative offset between the features of the scale and the sensor.

2. The absolute position encoder apparatus as claimed in claim 1, wherein the process for capturing a single snapshot is automatically adaptable dependent on an actual measured relative speed between the scale and the readhead.

3. The absolute position encoder apparatus as claimed in claim 2, wherein the actual measured relative speed is based on readings obtained by the readhead.

4. The absolute position encoder apparatus as claimed in claim 3, wherein the readhead is configured to determine the relative speed between the scale and the readhead.

5. The absolute position encoder apparatus as claimed in claim 1, wherein the readhead comprises at least one electromagnetic radiation ("EMR") sensitive detector.

6. The absolute position encoder apparatus as claimed in claim 5, wherein the at least one EMR sensitive detector is an optical EMR sensitive detector.

7. The absolute position encoder apparatus as claimed in claim 1, wherein the at least one EMR source is an optical source.

8. The absolute position encoder apparatus as claimed in claim 1, wherein the process for capturing a single snapshot is adaptable so as to change the intensity of EMR emitted by at least one of the at least one EMR sources.

9. The absolute position encoder apparatus as claimed in claim 1, wherein the process for capturing a single snapshot is adaptable so as to change feature detection sensitivity of the readhead dependent on the relative speed between the scale and readhead.

10. An absolute position encoder readhead configured to read features of a scale that encode along the length of the scale a series of unique position data pieces defining absolute position information to determine the relative position between the readhead and the scale, the readhead comprising:
a sensor configured to read the features via a process for capturing a single snapshot, the process being automatically adaptable so as to change, dependent on the relative speed between the scale and the readhead, at least one of:
(i) the feature capture duration of the readhead during the process, and
(ii) the duration that electromagnetic radiation ("EMR") is emitted by at least one electromagnetic radiation ("EMR") source during the process,
wherein the absolute position encoder readhead is further configured to use the captured snapshot to fine-tune a determined absolute position between the readhead and the scale by determining a relative offset between the features of the scale and the sensor.

11. The absolute position encoder readhead as claimed in claim 10, wherein the process for capturing a single snapshot is automatically adaptable dependent on an actual measured relative speed between the scale and the readhead.

12. The absolute position encoder readhead as claimed in claim 11, wherein the actual measured relative speed is based on readings obtained by the readhead.

13. The absolute position encoder readhead as claimed in claim 12, wherein the readhead is configured to determine the relative speed between the scale and the readhead.

14. The absolute position encoder readhead as claimed in claim 10, wherein the readhead comprises at least one electromagnetic radiation ("EMR") sensitive detector.

15. The absolute position encoder readhead as claimed in claim 14, wherein the at least one EMR sensitive detector is an optical EMR sensitive detector.

16. The absolute position encoder readhead as claimed in claim 10, wherein the at least one EMR source is an optical source.

17. The absolute position encoder readhead as claimed in claim 10, wherein the process for capturing a single snapshot is adaptable so as to change the intensity of EMR emitted by at least one of the at least one EMR sources.

18. The absolute position encoder readhead as claimed in claim 10, wherein the process for capturing a single snapshot is adaptable so as to change feature detection sensitivity of the readhead dependent on the relative speed between the scale and readhead.

19. A method of operating an absolute position encoder readhead, the method comprising:

reading, with a sensor of the readhead and via a process for capturing a single snapshot, features of a scale that encode along the length of the scale a series of unique position data pieces defining absolute position information; and automatically adapting the process by changing, dependent on the relative speed between the scale and the readhead, at least one of:
(i) the feature capture duration of the readhead during the process, and
(ii) the duration that electromagnetic radiation ("EMR") is emitted by at least one electromagnetic radiation ("EMR") source during the process, wherein the method further comprises using the captured snapshot to fine-tune a determined absolute position between the readhead and the scale by determining a relative offset between the features of the scale and the sensor.

20. The method as claimed in claim 19, further comprising automatically adapting the process for capturing a single snapshot dependent on an actual measured relative speed between the scale and the readhead.

21. The method as claimed in claim 20, further comprising:
determining the actual measured relative speed between the scale and the readhead based on readings taken by the readhead.

22. The method as claimed in claim 19, further comprising changing feature detection sensitivity of the readhead dependent on the relative speed between the scale and readhead.

23. The method as claimed in claim 19, further comprising changing the intensity of EMR emitted by at least one of the at least one EMR sources.

* * * * *